(12) United States Patent
Yasui et al.

(10) Patent No.: US 8,755,731 B2
(45) Date of Patent: Jun. 17, 2014

(54) AUTOMATIC DOCUMENT FEEDER, IMAGE SCANNING DEVICE, AND METHOD FOR FEEDING ORIGINAL DOCUMENT

(75) Inventors: Katsuaki Yasui, Kyoto (JP); Satoshi Washida, Kyoto (JP); Osamu Otsuki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/594,021

(22) Filed: Aug. 24, 2012

(65) Prior Publication Data

US 2013/0056921 A1 Mar. 7, 2013

(30) Foreign Application Priority Data

Sep. 6, 2011 (JP) .................... 2011-193655

(51) Int. Cl.
*G03G 5/00* (2006.01)
(52) U.S. Cl.
USPC ............ 399/364; 399/374; 271/184; 271/186
(58) Field of Classification Search
USPC .............................. 399/364, 374; 271/184, 186
See application file for complete search history.

(56) References Cited

U.S. PATENT DOCUMENTS

| | | | | | |
|---|---|---|---|---|---|
| 4,751,552 | A | * | 6/1988 | Itoigawa ...................... | 399/124 |
| 6,073,927 | A | * | 6/2000 | Sako et al. .................... | 271/225 |
| 6,522,860 | B2 | * | 2/2003 | Nose et al. .................... | 399/374 |
| 7,573,619 | B2 | * | 8/2009 | Tsai et al. ..................... | 358/498 |
| 7,778,587 | B2 | * | 8/2010 | Shoji ............................. | 399/367 |
| 7,931,271 | B2 | * | 4/2011 | Kusama ........................ | 271/186 |
| 8,398,075 | B2 | * | 3/2013 | Nose et al. .................... | 271/186 |
| 8,424,869 | B2 | * | 4/2013 | Korenaga ...................... | 271/186 |
| 2006/0280534 | A1 | * | 12/2006 | Cook et al. .................... | 399/374 |
| 2007/0212140 | A1 | * | 9/2007 | Xu et al. ........................ | 399/367 |
| 2008/0043294 | A1 | * | 2/2008 | Su et al. ........................ | 358/474 |
| 2010/0098472 | A1 | * | 4/2010 | Kawamura et al. ........... | 399/374 |
| 2012/0106987 | A1 | * | 5/2012 | Furusawa et al. ............. | 399/15 |

FOREIGN PATENT DOCUMENTS

JP 2010-269934 A 12/2010

* cited by examiner

*Primary Examiner* — Stefanos Karmis
*Assistant Examiner* — Ernesto Suarez
(74) *Attorney, Agent, or Firm* — Keating & Bennett, LLP

(57) ABSTRACT

An automatic document feeder includes a feeding path and a plurality of feed roller sets. Through the feeding path, an original document is fed in one direction from a paper supply port to a paper discharge port. The plurality of the feed roller sets are arranged along the feeding path to be spaced apart from each other. When one side of an original document is scanned and when both sides of an original document are scanned, the plurality of the feed roller sets nip the original document to feed the original document along the feeding path. In this case, the plurality of the feed roller sets are all involved in feeding the original document.

5 Claims, 7 Drawing Sheets

AUTOMATIC DOCUMENT FEEDER, IMAGE SCANNING DEVICE, AND METHOD FOR FEEDING ORIGINAL DOCUMENT

CROSS-REFERENCE TO RELATED APPLICATIONS

This application claims priority under 35 U.S.C. 119 to Japanese Patent Application No. 2011-193655 filed on Sep. 6, 2011, which application is hereby incorporated by reference in its entirety.

BACKGROUND OF THE INVENTION

1. Field of the Invention

The present invention relates to an automatic document feeder. Further, the present invention relates to an image scanning device including the automatic document feeder. Furthermore, the present invention relates to a method for feeding an original document.

2. Description of the Related Art

In a conventional automatic document feeder, a plurality of feed roller sets are arranged along a feeding path, and the plurality of the feed roller sets feed an original document (See, for example, Japanese Unexamined Patent Application Publication No. 2010-269934). Specifically, a one side feeding path dedicated for scanning one side of an original document and a two side feeding path dedicated for scanning both sides of an original document are provided. The plurality of the feed roller sets are arranged so that an original document can be fed along such feeding paths.

In the conventional automatic document feeder, the plurality of the feed roller sets feed an original document along the dedicated one side feeding path and the dedicated two side feeding path to scan the content of the original document. However, in such a conventional automatic document feeder, the plurality of the feed roller sets are prepared for the dedicated one side feeding path and the dedicated two side feeding path, respectively. Consequentially, there have existed a feed roller set(s) that is not used to scan one side of an original document but used only to scan both sides of an original document. For example, feed roller sets 42 and 43 (of the above-referenced publication) correspond to such a feed roller set. The existence of the feed roller set that is used only to scan both sides of an original document has forced the conventional automatic document feeder to include more feed roller sets than an automatic document feeder configured otherwise. Various unsuccessful efforts have been made to reduce the number of feed roller sets.

SUMMARY OF THE INVENTION

Preferred embodiments of the present invention provide an automatic document feeder and a method for feeding an original document, in which feed rollers are efficiently used when one side of an original document is scanned and when both sides of an original document are scanned.

A plurality of preferred embodiments are described below and features thereof can be arbitrarily combined, as desired.

An automatic document feeder according to a preferred embodiment of the present invention includes a feeding path and a plurality of feed roller sets. Through the feeding path, an original document is fed in one direction from a paper supply port to a paper discharge port. The plurality of the feed roller sets are spaced apart from each other along the feeding path. When one side of an original document is scanned and when both sides of an original document are scanned, the plurality of the feed roller sets nip the original document to feed the original document along the feeding path. In this case, the plurality of the feed roller sets are all involved in feeding the original document.

When an original document is fed in one direction from the paper supply port to the paper discharge port through the feeding path, the feed roller sets are all involved in feeding the original document. In other words, there exists no feed roller set that is not involved in feeding an original document when one side of the original document is scanned and when both sides of the original document are scanned. As described above, the automatic document feeder according to a preferred embodiment of the present invention uses the feed rollers efficiently when one side of an original document is scanned and when both sides of an original document are scanned. Accordingly, the number of feed roller sets is reduced. Further, since the number of feed roller sets is reduced, cost reduction, downsizing of an automatic document feeder and the like are also achieved.

In the automatic document feeder according to a preferred embodiment of the present invention, when one side of an original document is scanned and when both sides of an original document is scanned, each of the plurality of the feed roller sets nips the original document at least one time to feed the original document along the feeding path.

In the above case, when an original document is scanned, the feeding path is arranged to make each of the feed roller sets feed the original document at least one time along the feeding path, through which the feed roller sets are arranged. Accordingly, there exists no feed roller set that is not involved in feeding an original document, and the feed roller sets are used efficiently.

In the automatic document feeder, at least any of the plurality of the feed roller sets preferably is a triple roller. The triple roller includes a pair of driven rollers facing each other and a drive roller arranged between the pair of the driven rollers. In the automatic document feeder, the feeding path and the triple roller are arranged such that an original document is fed as described below. When one side of an original document is scanned, the original document passes between either of the pair of the driven rollers and the drive roller. When both sides of an original document are scanned, the original document passes between either of the pair of the driven rollers and the drive roller and then between the other of the pair of the driven rollers and the drive roller.

In the above case, by using the triple roller as described above, when one side of an original document is scanned and when both sides of an original document are scanned, one drive roller can feed the original document. Accordingly, the number of feed roller sets can be reduced. In other words, the feed rollers can be used efficiently.

In the automatic document feeder, the triple roller is preferably arranged upstream of a scanning position for an original document on the feeding path, and skew correction of an original document is performed by the triple roller.

In the above case, the skew correction of an original document is performed by arranging the triple roller upstream of the scanning position for an original document. Accordingly, for example, when supplying an original document (when one side of an original document is scanned and when both sides of an original document are scanned), the skew correction is performed between the drive roller and either of the driven rollers to allow the original document to be fed. Further, when both sides of an original document are scanned, the original document is also fed on the feeding path between the drive roller and the other driven roller. Thus, the feed rollers are used efficiently.

In the automatic document feeder, the triple roller preferably is arranged in proximity to a paper discharge port on the feeding path.

In the above case, for example, when one side of an original document is scanned, the original document can be fed to the paper discharge port on the feeding path between the drive roller and either of the driven rollers. Further, when both sides of an original document are scanned, the original document is fed on the feeding path between the drive roller and the other driven roller, and then the original document is fed toward the paper discharge port on the feeding path between the drive roller and the either of the driven rollers. In this way, the feed rollers are used efficiently.

The automatic document feeder further includes a switching unit. The switching unit switches a path between a path to discharge an original document when one side of the original document is scanned and a path to reverse an original document when both sides of the original document are scanned. The triple roller is arranged on the feeding path between the scanning position for an original document and the switching unit.

In the above case, by arranging the triple roller between the scanning position for an original document and the switching unit, an original document whose surface has been scanned can be fed to the switching unit on the feeding path between the drive roller and either of the driven rollers. Further, an original document whose surface has been scanned can be again fed to the scanning position for an original document on the feeding path between the drive roller and the other driven roller. In this way, the feed rollers are used efficiently.

In the automatic document feeder, any of the plurality of the feed roller sets preferably is a roller set that is capable of normal and reverse rotations.

In the above case, since any of the plurality of the feed roller sets preferably is a roller set that is capable of normal and reverse rotations, an original document can be fed in two ways on the feeding path on which this feed roller set are arranged. In other words, the feeding path can be used efficiently. Accordingly, the feeding path can be simplified, and the automatic document feeder can be made smaller.

The automatic document feeder includes a main body and a cover portion attached to the main body in an openable and closable manner. Coupling portions of the main body and the cover portion preferably have a comb shape that is complementary to each other. In this case, by engaging a coupling portion of the cover portion with a coupling portion of the main body, the cover portion is positioned against the main body.

In the above case, since the coupling portion of the cover portion is engaged with the coupling portion of the main body, the cover portion is positioned against the main body without using a special fixing member or a fixing mechanism. The elimination of such a fixing member or a fixing mechanism makes the automatic document feeder smaller.

An image scanning device according to a preferred embodiment of the present invention includes the above-described automatic document feeder and a scanning unit arranged to scan one side of an original document or both sides of an original document on the feeding path. Also in this case, the same advantages as described above can be achieved.

In the image scanning device, the scanning unit is provided with a contact glass and a fixing member. The contact glass preferably has a trapezoidal shape in a cross-sectional view. At least a portion of the fixing member is in contact with an inclined portion of the contact glass to fix the contact glass.

In the above case, by making at least the portion of the fixing member contact with the inclined portion of the contact glass, the contact glass is fixed by the fixing member. Even if a load is applied to an upper portion of the fixing member, deflection of the fixing member can be restricted by the contact glass.

A method for feeding an original document according to another preferred embodiment of the present invention allows all of a plurality of feed roller sets to nip and feed an original document at least one time along a feeding path through which the original document is fed in one direction from a paper supply port to a paper discharge port, when one side of the original document is scanned and when both sides of the original document are scanned.

In the above case, when an original document is fed in one direction through the feeding path from the paper supply port to the paper discharge port, the feed roller sets are all involved in feeding the original document. In other words, there exists no feed roller set that is not involved in feeding the original document when one side of the original document is scanned and when both sides of the original document are scanned. In this way, the feed rollers are used efficiently when one side of an original document is scanned and when both sides of an original document are scanned.

In the automatic document feeder, the image scanning device and the method for feeding an original document according to various preferred embodiments of the present invention, the feed rollers are used efficiently when one side of an original document is scanned and when both sides of an original document are scanned.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Firstly, an entire configuration of a multifunctional peripheral according to a preferred embodiment of the present invention is described. The multifunctional peripheral preferably performs functions such as facsimile, scanning, copying, printing and the like. Hereinafter, a description "one side of an original document is scanned" is used to mean "only one side (one surface) of an original document is scanned". Further, a description "both sides of an original document are scanned" is used to mean "one side (one surface) and the reverse side (the other surface) of an original document are scanned". Furthermore, a description "upstream (an upstream side) and/or downstream (a downstream side) of a given location and/or a given member (unit)" means "upstream (the upstream side) and downstream (the downstream side) in a direction in which an original document is fed (original document feeding direction) using as a standard the given location and/or the given member (unit) or the like.

Figure 1:
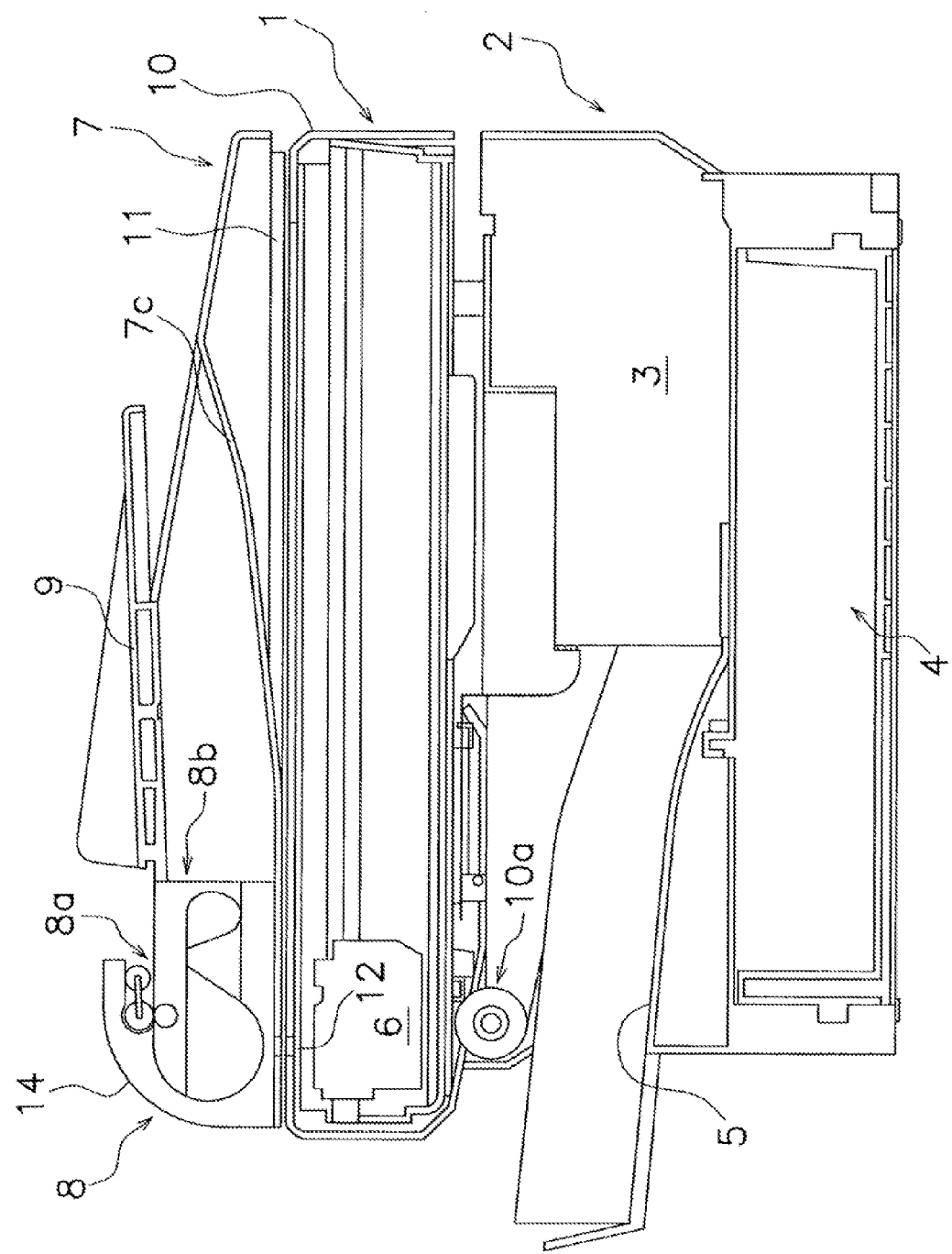
FIG. 1 is a side cross-sectional view of a multifunctional peripheral according to a preferred embodiment of the present invention.

As illustrated in FIG. 1, the multifunctional peripheral includes a scanning unit 1, a recording unit 2, and a platen cover 7. The scanning unit 1 is freely-rotatably attached to the recording unit 2. For example, the scanning unit 1 is freely-rotatably attached to the recording unit 2 around a hinge unit 10a. The scanning unit 1 includes a scanning unit main body 10, a transparent bed for placing an original document 11, and a scanning device 6. The bed 11 is mounted on the upper surface of the scanning unit main body 10. The scanning device 6 is incorporated in the scanning unit main body 10. For example, when an original document is placed on the bed 11, the scanning device 6 scans the original document along the bed 11.

Figure 2:
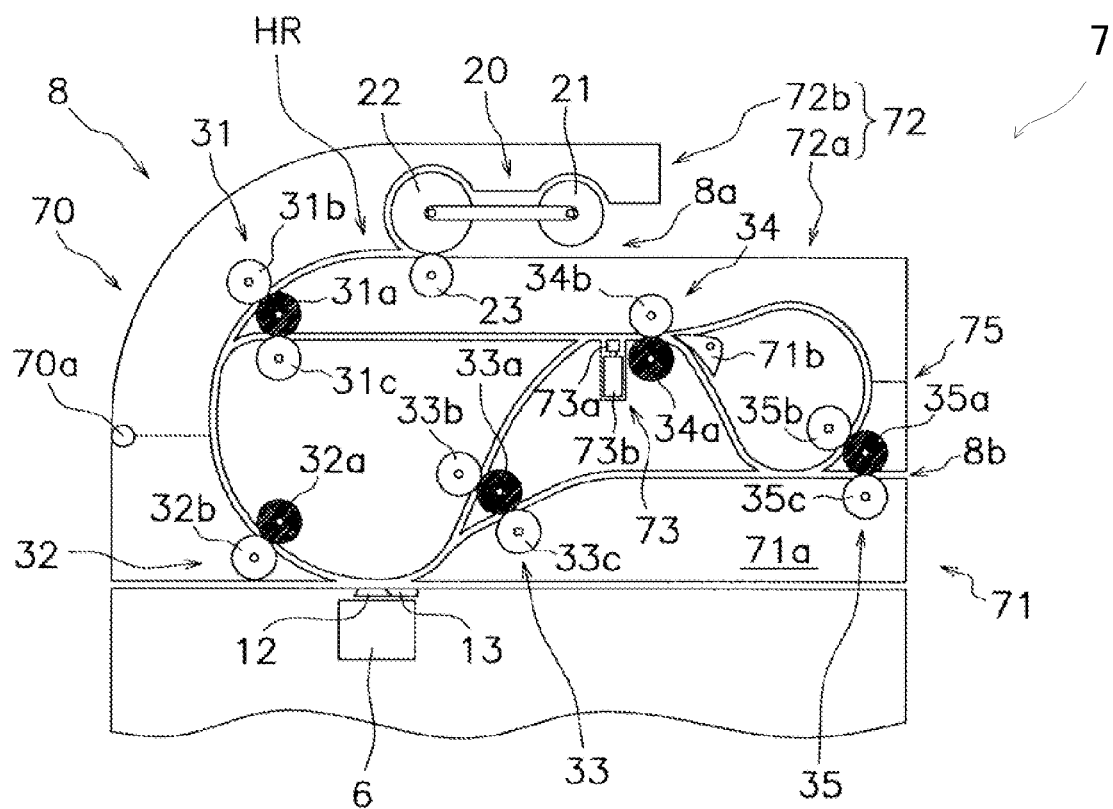
FIG. 2 is a side cross-sectional view of an automatic document feeder of the multifunctional peripheral according to a preferred embodiment of the present invention.
Figure 3:
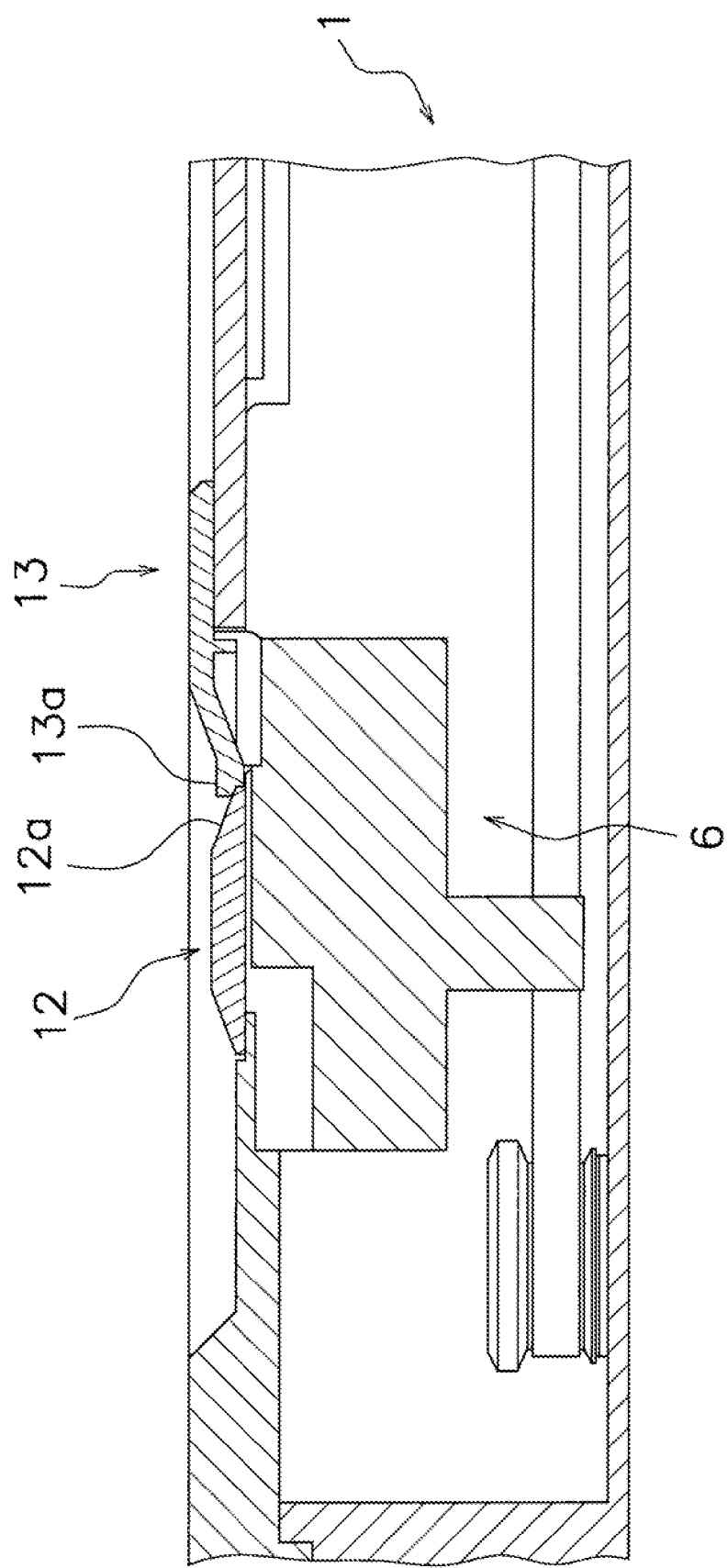
FIG. 3 is an enlarged cross-sectional view of a contact glass and its vicinity according to a preferred embodiment of the present invention.

Further, as illustrated in FIGS. 1 to 3, the scanning unit 1 also includes a contact glass 12 and a fixing member 13. The contact glass 12 is a transparent member extending in one direction. A cross section of the contact glass 12 in the short-side direction preferably has a trapezoidal shape. The fixing member 13 is used to fix the contact glass 12 to the scanning unit main body 10. The fixing member 13 is a member elongated in one direction and is fixed to the scanning unit main body 10. A projection 13a contacting with an inclined portion (an inclined portion of the trapezoidal in cross section) 12a of the contact glass 12 is provided on the fixing member 13. The fixing member 13 is fixed to the scanning unit main body 10 under a state in which the projection 13a of the fixing member 13 is made to contact with an upper portion of the contact glass 12, that is, the inclined portion 12a. Accordingly, even if a load is applied to the upper portion of the fixing member 13, deflection of the fixing member 13 can be restricted.

As illustrated in FIG. 1, the recording unit 2 includes a recording device 3 and a paper feeding cassette 4 one above the other. In the paper feeding cassette 4, recording papers are stacked. A recording paper is fed from the paper feeding cassette 4 to the recording device 3. Then, after the content of an original document is recorded on the recording paper, the recording paper is discharged onto a recording paper discharge tray 5.

As illustrated in FIG. 1, the platen cover 7 is arranged to press from above an original document placed on the scanning unit 1, for example, the bed 11. The platen cover 7 is provided above the scanning unit 1. For example, the platen cover 7 is provided on the scanning unit main body 10 in a vertically operable and closable manner.

As illustrated in FIG. 2, the platen cover 7 includes a main body 71, a cover portion 72, and a stamp unit 73. The main body 71 is provided on the scanning unit main body 10 in a vertically openable and closable manner. The main body 71 includes a main body chassis 71a and a switching unit 71b. The switching unit 71b is arranged to switch a path that guides an original document on a feeding path HR for an original document. For example, the switching unit 71b switches a path between a path that discharges an original document (a paper discharge path, which is described below) and a path that reverses an original document when both sides of an original document are scanned (a reverse path R5, which is described below). The switching unit 71b is freely swingably attached to the main body chassis 71a. The swinging movement of the switching unit 71b is controlled by a controller (not illustrated).

As illustrated in FIG. 2, the cover portion 72 is attached to the main body 71 in a freely openable and closable manner. The cover portion 72 includes a first cover portion 72a and a second cover portion 72b. Specifically, the first cover portion 72a is attached to the main body 71 in an openable and closable manner above the main body 71. The first cover portion 72a can be opened and closed upon, for example, a rotation shaft of a first drive roller 31a, which is described below. The second cover portion 72b is attached to the main body 71 in an openable and closable manner above the first cover portion 72a. The second cover portion 72b can be opened and closed upon a hinge portion 70a.

Figure 4:
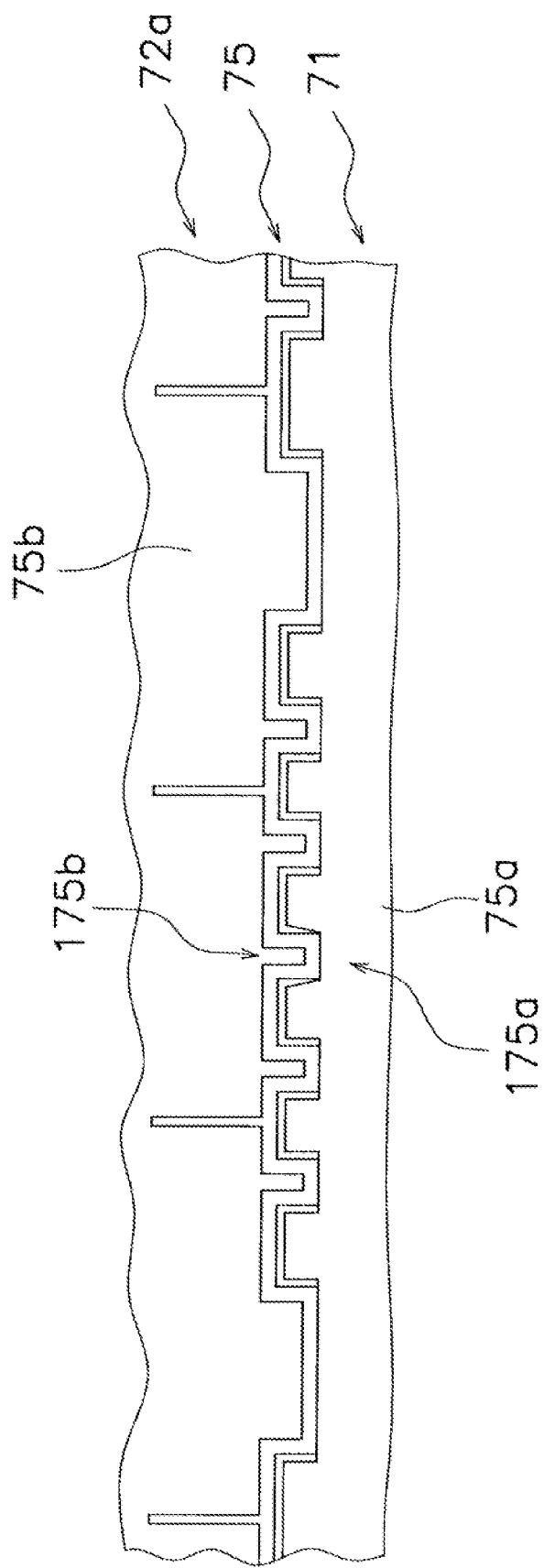
FIG. 4 is a side view of a coupling portion that couples a main body with a cover portion and its vicinity according to a preferred embodiment of the present invention.

As illustrated in FIGS. 2 and 4, a coupling portion 75 of the main body 71 and the cover portion 72 preferably has a comb shape. More specifically, the coupling portion 75 (75a, 75b) where the main body 71 and the first cover portion 72a are coupled together preferably has a comb shape. Accordingly, by engaging the coupling portion 75b of the first cover portion 72a with the coupling portion 75a of the main body 71, the first cover portion 72a is positioned against the main body 71. Specifically, a concave portion 175a in the middle of the coupling portion 75a of the main body 71 preferably has a trapezoidal shape. Accordingly, a convex portion 175b in the middle of the coupling portion 75b of the first cover portion 72a can be easily guided to the concave portion 175a in the middle of the coupling portion 75a of the main body 71. Further, by fitting the convex portion 175b in the middle of the coupling portion 75b into the concave portion 175a in the middle of the coupling portion 75a, the coupling portion 75b of the first cover portion 72a and the coupling portion 75a of the main body 71 can be easily positioned.

Figure 5:
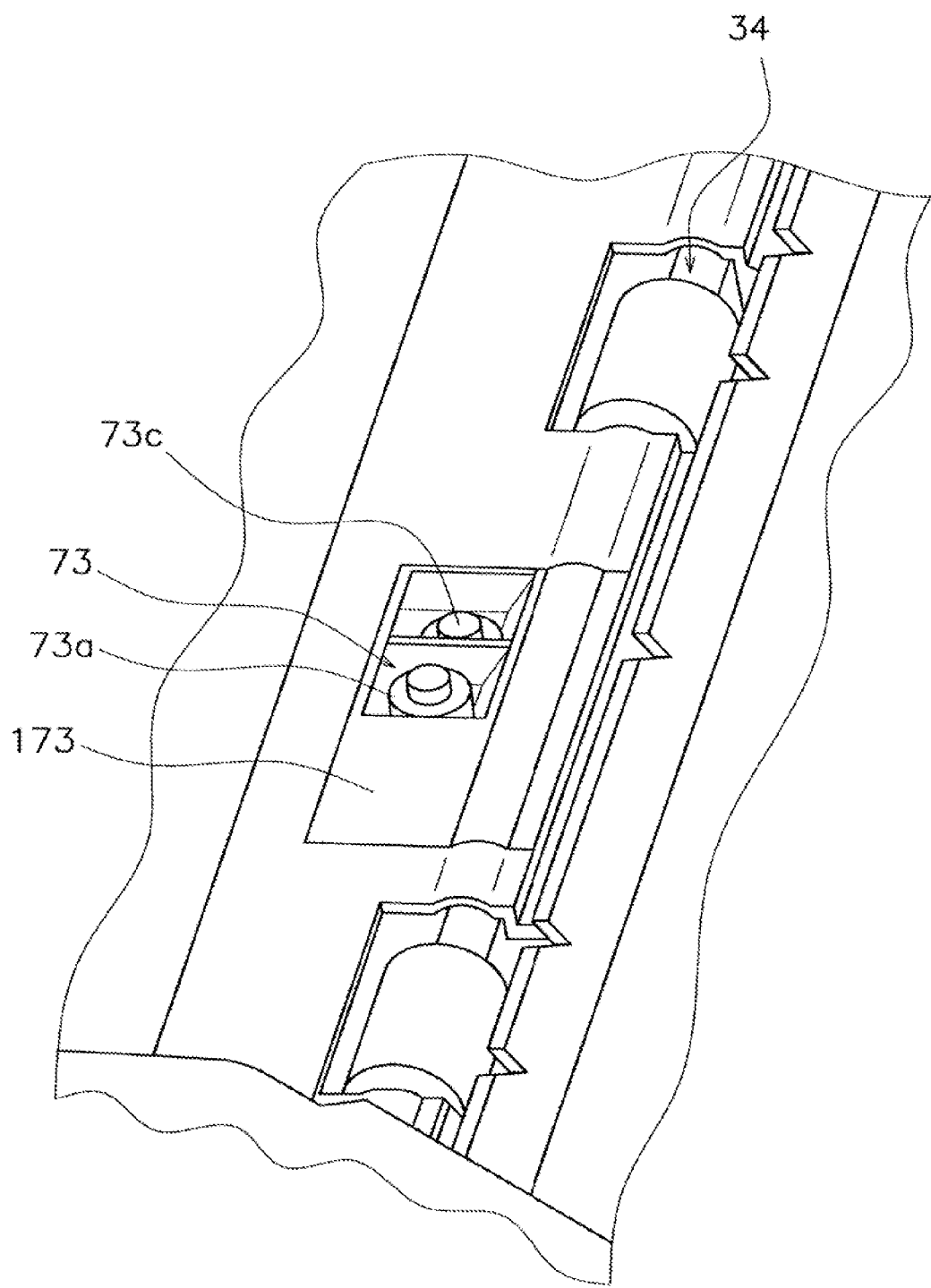
FIG. 5 is a top view of a stamp unit according to a preferred embodiment of the present invention.

As illustrated in FIGS. 2 and 5, the stamp unit 73 is arranged to stamp a character, a mark, or the like on an original document. The stamp unit 73 stamps an original document downstream of the scanning unit 1 (scanning position P2) after one side of an original document is scanned or after both sides of an original document are scanned. The stamp unit 73 is fitted into a concave portion provided on the main body 71 (refer to FIG. 2). Further, the stamp unit 73 is fixed to the main body 71 by a lid member 173 (an example of the fixing member used to fix the stamp unit 73) having an opening (refer to FIG. 5). The lid member 173 is fixed to the main body 71 preferably by a fixing screw 73c, for example.

As illustrated in FIG. 2, the stamp unit 73 includes a stamp body 73a, and a stamp body holding unit 73b supporting the stamp body 73a so as to be freely advanceable and retreatable. As illustrated in FIG. 5, the stamp body holding unit 73b of the stamp unit 73 is fit into the concave portion of the main body 71 and the stamp body 73a of the stamp unit 73 is arranged in the opening of the lid member 173. The stamp body holding unit 73b preferably includes, for example, a solenoid, and supports the stamp body 73a so as to be freely advanceable and retreatable.

The stamp unit 73 stamps a character, a mark, or the like on an original document downstream of the scanning position P2. More specifically, after one side of an original document is scanned or after both sides of an original document are scanned, the stamp unit 73 stamps a character, a mark, or the like on the original document downstream of the scanning position P2. The scanning position P2 refers to a position where an original document is scanned at the scanning unit 1. Specifically, the scanning position P2 is a position where an original document is scanned on the contact glass 12 with the scanning device 6. A preferred embodiment in which the stamp unit 73 is arranged in an automatic document feeder (ADF) 8 is specifically described below.

As illustrated in FIG. 1, the platen cover 7 is provided with the ADF 8. In the ADF 8, a feeding path HR through which an original document is fed from a paper supply port 8a to a paper discharge port 8b is configured. An original document supplying tray 9 arranged to guide a paper to the paper supply port 8a of the ADF 8 is provided above the platen cover 7. At an upper surface of the platen cover 7, an original document discharge tray 7c arranged to receive a paper discharged from the paper discharge port 8b of the ADF 8 is provided.

As illustrated in FIG. 2, the ADF 8 includes the chassis 70, a paper feeding roller unit 20 and a plurality of feed roller sets 31, 32, 33, 34, and 35. The chassis 70 preferably includes the main body 71 (the main body chassis 71a) and the cover portion 72. The paper feeding roller unit 20 is arranged to supply an original document along the feeding path. The paper supplying roller unit 20 is rotatably attached to the cover portion 72. The paper supplying roller unit 20 includes a pick-up roller 21, a separate roller 22, and a retard roller 23 facing the separate roller 22. The pick-up roller 21 and the separate roller 22 are rotatably attached to the first cover portion 72a. The retard roller 23 is rotatably attached to the second cover portion 72b. Instead of the retard roller 23, a member other than a roller, such as a separation pad, may be used.

As illustrated in FIG. 2, the plurality of the feed roller sets, for example, five feed roller sets 31, 32, 33, 34 and 35, are rotatably provided to the chassis 70. The feed roller sets 31, 32, 33, 34 and 35 are respectively arranged to be spaced apart from each other through the feeding path HR. For example, the feed roller sets 31, 32, 33, 34 and 35 are arranged to be spaced apart by a distance(s) that is below a paper length in the feeding direction. The feed roller sets 31, 32, 33, 34 and 35 nip an original document and feed the original document along the feeding path HR.

When one side of an original document is scanned, the feed roller sets 31, 32, 33, 34 and 35 are all involved in feeding the original document. Further, when both sides of an original document are scanned, the feed roller sets 31, 32, 33, 34 and 35 are also all involved in feeding the original document. In other words, when one side of an original document is scanned, the feed roller sets 31, 32, 33, 34 and 35 nip the original document at least one time to feed the original document. Further, when both sides of an original document are scanned, the feed roller sets 31, 32, 33, 34 and 35 also nip the original document at least one time to feed the original document. Drive rollers 31a, 32a, 33a, 34a and 35a (first to fifth drive rollers, which are described below) respectively included in the feed roller sets 31, 32, 33, 34 and 35 in the figures are hatched (painted in black).

In the present preferred embodiment, the five feed roller sets 31, 32, 33, 34 and 35 preferably include two twin rollers 32 and 34 and three triple rollers 31, 33 and 35, for example. The two twin rollers 32 and 34 preferably include drive rollers 32a and 34a (a second drive roller and a fourth drive roller, both of which are described below) and driven rollers 32b and 34b. The drive rollers 32a and 34a are rollers that are driven by a driving device (not illustrated), such as a motor. The driven rollers 32b and 34b are rollers that are rotated by the drive rollers 32a and 34a. Further, the twin roller 32 arranged in proximity to the scanning unit 1 (scanning position P2) is a roller set that is capable of normal and reverse rotations.

The three triple rollers 31, 33 and 35 preferably include drive rollers 31a, 33a and 35a (a first drive roller, a third drive roller and a fifth drive roller, all of which are described below) and the driven rollers (31b, 31c), (33b, 33c) and (35b, 35c). In the same way as the two twin rollers 32, 34, each of the drive rollers 31a, 33a and 35a are rollers that are driven by the driving device. In the same way as the two twin rollers 32, 34, the driven rollers (31b, 31c), (33b, 33c) and (35b, 35c) are also rollers that are rotated by the drive rollers 31a, 33a and 35a. In each of the three triple rollers 31, 33 and 35, the driven rollers (31b, 31c), (33b, 33c), and (35b, 35c) are arranged to face one another. Each of the drive rollers 31a, 33a and 35a is arranged between the driven rollers (31b, 31c), (33b, 33c) and (35b, 35c).

When one side of an original document is scanned, the original document passes between each of the drive rollers 31a, 33a, and 35a and either of the pairs of the driven rollers (31b, 31c), (33b, 33c), and (35b, 35c). On the other hand, when both sides of an original document are scanned, the original document passes between each of the drive rollers 31a, 33a and 35a and either of the pairs of the driven rollers (31b, 31c), (33b, 33c) and (35b, 35c). In this case, the original document also passes between each of the drive rollers 31a, 33a, and 35a and the other of the pairs of the driven rollers (31b, 31c), (33b, 33c) and (35b, 35c).

The drive rollers 31a, 33a, and 35a may be driven to rotate by a driving device via a drive transmission mechanism (not illustrated). The driving device and the drive transmission mechanism are provided in the main body 71. A preferred embodiment of an arrangement of the two twin rollers 32 and 34 and the three triple rollers 31, 33 and 35 in the ADF 8 is described below.

In a multifunctional peripheral having the above-described configuration, original documents stacked up on the original document supplying tray 9 are picked up one by one and guided from the paper supply port 8a into the ADF 8. When an original document passes above the contact glass 12 in the ADF 8, the content of the original document is scanned by the scanning device 6. The scanned original document is discharged onto the original document discharge tray 7c from the paper discharge port 8c.

As described above, the scanning unit 1 can be used as a flatbed scanner and also as a sheet-feed scanner. When the scanning unit 1 is used as a flatbed scanner, the scanning device 6 is controlled to conduct scanning to scan an original document placed on the bed 11. Further, when the scanning unit 1 is used as a sheet-feed scanner, an original document fed by the ADF 8 is scanned by the scanning device 6 fixed to a position below the contact glass 12.

A scanning unit main body 10 is provided with an input unit (not illustrated), for example, a key panel. By operating the key panel, the content of an original document is scanned, a destination is set when the scanned content is faxed, and a received content or the scanned content is recorded in the recording device 3.

Next, an internal configuration of the ADF 8 is described. In the present preferred embodiment, in a side cross sectional view illustrated in FIG. 2, a horizontal direction pointing toward a direction in which an original document on the paper feeding tray 9 is fed is defined as a front-back direction, and a direction horizontally perpendicular to the front-back direction is defined as a right-left direction.

Figure 6:
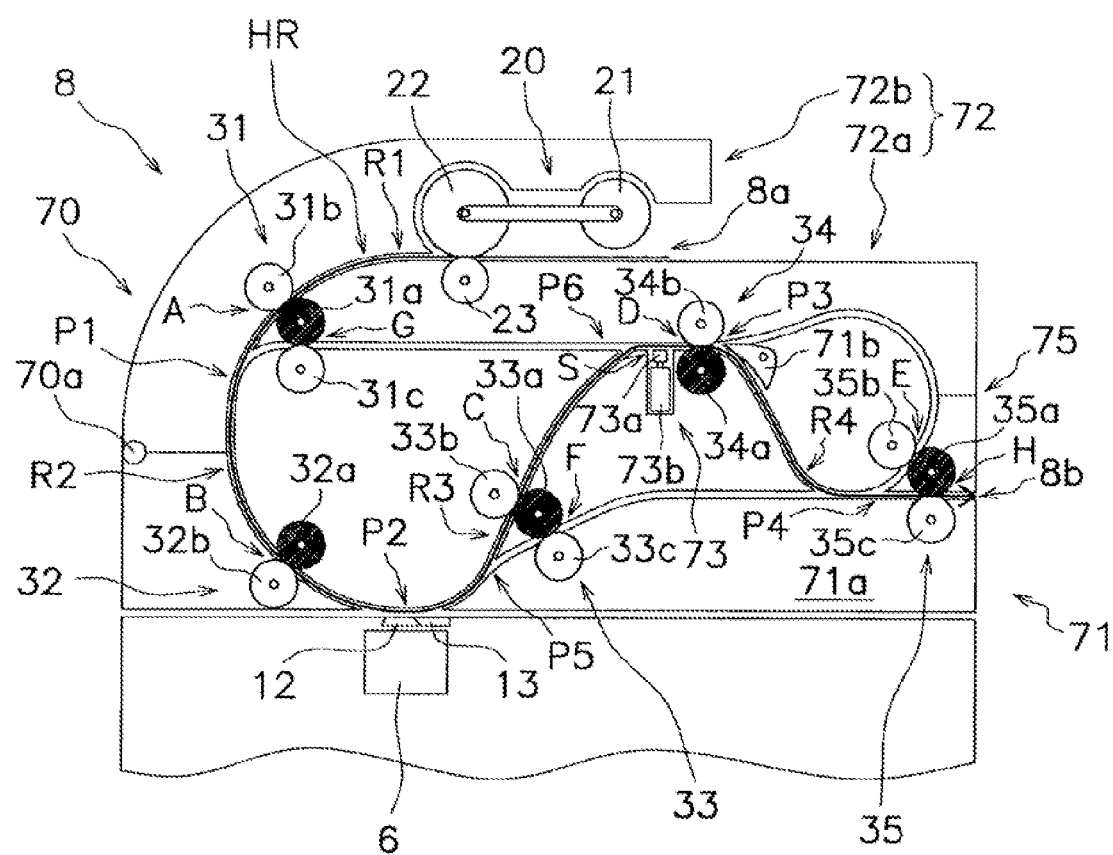
FIG. 6 is a side cross-sectional view of the automatic document feeder, illustrating a feeding flow of an original document (when one side of the original document is scanned).
Figure 7:
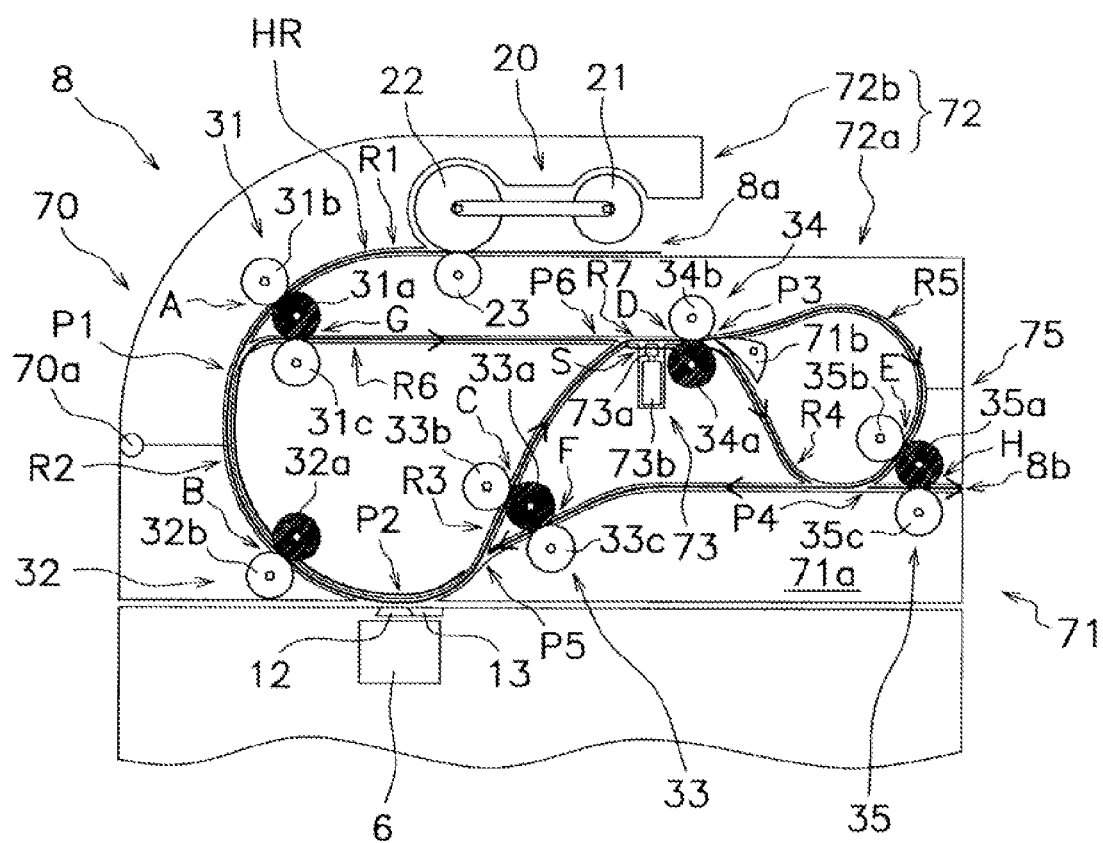
FIG. 7 is a side cross-sectional view of the automatic document feeder, illustrating a feeding flow of an original document (when both sides of the original document are scanned).

As illustrated with bold lines in FIGS. 6 and 7, an original document is fed in one direction from the paper supply port 8a to the paper discharge port 8b through the feeding path HR of the ADF 8. As described below, the feeding path HR is arranged such that at least a portion of the feeding path HR is substantially horizontal. The feeding path HR for one side scanning (refer to the bold line in FIG. 6) includes a paper supplying path R1, an introducing path R2, a first intermediate path R3, and a paper discharge path R4. Through the paper feeding path R1, an original document is guided from the paper supply port 8a into the main body 71 of the platen cover 7. Through the introducing path R2, the original document is guided from the paper supplying path R1 to the scanning position P2. Through the first intermediate path R3, the original document is guided from the scanning position P2 to a selecting position P3 on which a path for feeding the original document is selected. Through the paper discharge path R4, the original document is guided from the selecting position P3 to the paper discharge port 8b.

Hereinafter, a portion where the paper feeding path R1 and the introducing path R2 are connected is referred to as a first branch point P1. A portion where the introducing path R2 and the first intermediate path R3 are connected is the above-described scanning position P2. A portion where the first intermediate path R3 and the paper discharge path R4 are connected is the above-described switching position P3. At the switching position P3, by swinging the selecting unit 71b, it is determined whether an original document is discharged or reversed. For example, when one side of an original document is scanned, by swinging the selecting unit 71b upward, the original document is guided to the paper discharge path R4 and then discharged.

The feeding path HR for both side scanning includes the paper supplying path R1, the introducing path R2, the first intermediate path R3, a reverse path R5, a second intermediate path R6, and the paper discharge path R4 (refer to the bold line in FIG. 7). In this case, the paper supplying path R1, the introducing path R2, the first intermediate path R3 and the paper discharge path R4 are the same as the paths included in the feeding path HR for one side scanning, and thus descriptions of the paths is omitted. Hereinafter, only the reverse path R5 and the second intermediate path R3 are described.

Through the reverse path R5, an original document is guided from the switching position P3 to the scanning position P2 while being reversed. The reverse path R5 includes a portion of the first intermediate path R3 (the portion on the side of the scanning position P2). A portion of the reverse path R5, for example, an upstream portion of the reverse path R5, is arranged between the main body 71, and the cover portion 72, for example, a first cover portion 72a. When the cover portion 72, for example, the first cover portion 72a is opened, the feeding path of this portion is exposed.

Through the second intermediate path R6, an original document is guided from the scanning position P2 to the selecting position P3. The second intermediate path R6 includes a portion of the first intermediate path R3 (the portion on the side of the selecting position P3, that is, an overlapping path R7, which is described below) and the introducing path R2. Further, a portion of the second intermediate path R6, for example, a feeding path between the first branch point P1 and the selecting position P3, is arranged between the main body 71, and the cover portion 72, for example, the first cover portion 72a. When the cover portion 72, for example, the first cover portion 72a is opened, the feeding path of this portion is exposed. The feeding path of this portion is preferably substantially horizontal. On the feeding path of this portion, after one side of an original document is scanned and after both sides of an original document are scanned, a portion where an original document passes overlappingly (an overlapping path R7) is a path between a position P6 where the second intermediate path R6 joins the first intermediate path R3 (a meeting point which is described below) and the selecting position P3.

A path through which one side (one surface) of an original document is scanned and then the back side (the back surface) of the original document is scanned, in other words, the first intermediate path R3 and the reverse path R5 (scanning position P2→selecting position P3→intersection P4→second branch point P5→scanning position P2), is formed into a loop.

Hereinafter, a portion at which the reverse path R5 and the paper discharge path R4 intersect is referred to as an intersection P4. Further, a portion at which the reverse path R5 joins the first intermediate path R3 is referred to as a second branch point P5. Furthermore, a portion where the second intermediate path R6 joins the first intermediate path R3 is referred to as a meeting point P6. At the selecting position P3, by swinging the selecting unit 71b, it is determined whether an original document is discharged or reversed. In this case, by swinging the selecting unit 71b downward, an original document is guided to the reverse path R5, and by swinging the selecting unit 71b upward, an original document is guided to the paper discharge path R4.

Next, a preferred embodiment of an arrangement of the five feed roller sets 31, 32, 33, 34 and 35 (e.g., two twin rollers 32 and 34, and three triple rollers 31, 33 and 35) is described.

Upstream of the scanning unit 1 (scanning position P2), for example, in proximity to the first branch point P1, a first triple roller 31 is arranged. The drive roller 31a (first drive roller) of the triple roller 31 is rotatably attached to the first cover portion 72a at a position between the paper supplying path R1 and the second intermediate path R6. One driven roller 31b adjacent to the first drive roller 31a is freely rotatably attached to the second cover portion 72b. The other driven roller 31c adjacent to the first drive roller 31a is freely rotatably attached to the main body 71d.

The first drive roller 31a is a roller used for resist correction, for example, skew correction. The first drive roller 31a and one driven roller 31b correct the skew of an original document passing through the paper supplying path R1, and feed the original document to the scanning position P2. The first drive roller 31a and the other driven roller 31c feed an original document passing through the second intermediate path R6 toward the selecting position P3. A nip portion between the first drive roller 31a and the one driven roller 31b is marked with a sign A. Further, a nip portion between the first drive roller 31a and the other driven roller 31c is marked with a sign G.

Between the first branch point P1 and the scanning unit 1 (scanning position P2), a first twin roller 32 is arranged. The drive roller 32a (second drive roller) of the first twin roller 32 is a roller that is capable of normal and reverse rotations. The second drive roller 32a is rotatably attached to the main body 71. The driven roller 32b of the first twin roller 32 is freely rotatably attached to the main body 71. When rotating in a normal direction, the second drive roller 32a and the driven roller 32b feed an original document passing through the introducing path R2 toward the scanning position P2. On the other hand, when rotating in a reverse direction, the second drive roller 32a and the driven roller 32b feed an original document passing through the second intermediate path R6 (including the introducing path R2) toward the first branch point P1. A nip portion between the second drive roller 32a and the driven roller 32b is marked with a sign B.

Downstream of the scanning unit 1 (scanning position P2), for example, between the scanning unit 1 (scanning position P2) and the selecting unit 71b, a second triple roller 33 is arranged. In other words, in proximity to the second branch point P5, the second triple roller 33 is arranged. The drive roller 33a (third drive roller) of the second triple roller 33 is rotatably attached to the main body 71 at a position between the first intermediate path R3 and the reverse path R5. One driven roller 33b and the other driven roller 33c adjacent to the third drive roller 33a are freely rotatably attached to the main body 71.

The third drive roller 33a and one driven roller 33b feed an original document passing through the first intermediate path R3 toward the switching position P3. The third drive roller 33a and the other driven roller 33c feed an original document passing through the reverse path R5 toward the second branch point P5 and the scanning position P2. A nip portion between the third drive roller 33a and one driven roller 33b is marked with a sign C. Further, a nip portion between the third drive roller 33a and the other driven roller 33c is marked with a sign F.

In proximity to the selecting position P3, for example, in proximity to the selecting position P3 between the scanning position P2 and the selecting position P3, a second twin roller 34 is arranged. The drive roller 34a (fourth drive roller) of the second twin roller 34 is rotatably attached to the main body 71. The driven roller 34b of the second twin roller 34 is freely rotatably attached to the first cover portion 72a. The fourth drive roller 34a and the driven roller 34b feed an original document passing through the first intermediate path R3 and the second intermediate path R6 toward the selecting position P3. A nip portion between the fourth drive roller 34a and the driven roller 34b is marked with a sign D.

In proximity to the intersection P4, for example, in the proximity to the paper discharge port 8b, a third triple roller 35 is arranged. The drive roller 35a (fifth drive roller) of the third triple roller 35 is rotatably attached to the main body 71 at a position between the reverse path R5 and the paper discharge path R4. One driven roller 35b and the other driven roller 35c adjacent to the fifth drive roller 35a are freely rotatably attached to the main body 71.

The fifth drive roller 35a and one driven roller 35b feed an original document passing through the reverse path R5 toward the intersection P4. The fifth drive roller 35a and the other driven roller 35c feed an original document passing through the paper discharge path R4 toward the paper discharge port 8b. A nip portion between the fifth drive roller 35a and one driven roller 35b is marked with a sign E. Further, a nip portion between the fifth drive roller 35a and the other driven roller 35c is marked with a sign H.

Next, a preferred embodiment of an arrangement of the stamp unit 73 is described. The stamp unit 73 is arranged on a feeding path located downstream of the scanning unit 1 (scanning position P2). The stamp unit 73 is arranged on the feeding path between the scanning unit 1 (scanning position P2) and the selecting unit 71b (selecting position P3), for example, on the first intermediate path R3. Further, the stamp unit 73 is arranged on the feeding path between the first branch point P1 and the selecting unit 71b (selecting position P3), for example, on the second intermediate path R6.

Specifically, the stamp unit 73 is arranged on a portion where an original document passes overlappingly when one side of the original document is scanned and both sides of the original document are scanned. More specifically, the stamp unit 73 is arranged at a portion where the first intermediate path R3 and the second intermediate path R6 overlap (the overlapping path R7). The overlapping path R7 is a path between the meeting point P6 and the selecting position P3. As described above, the overlapping path R7 preferably is substantially horizontal. Hereinafter, a position on which a stamp is arranged, in other words, a position where a direction, in which the stamp unit 73 (the stamp body 73a) moves in a freely advanceable and retreatable manner, intersects with the feeding path, is referred to as a stamp position S.

When the cover portion 72, for example, the first cover portion 72a is opened, the portion of the second intermediate path R6, for example, the feeding path between the first branch point P1 and the selecting position P3 is exposed. In this preferred embodiment, the stamp unit 73, for example, the stamp body 73a of the stamp unit 73 is also exposed. Under this condition, when the lid member 173 is removed from the main body 71, the stamp unit 73 can be easily accessed.

Lastly, an order of feeding an original document and stamping by the stamp unit 73 is described. When one side of an original document is scanned, the original document is placed on the original document supplying tray 9 with its surface upward. Then, the original document is fed in this order: the paper supply port 8a, the nip portion A, the nip portion B, the scanning position P2, the nip portion C, the nip portion D, the selecting position P3, the nip portion H, and the paper discharge port 8b. Accordingly, one side (one surface) of the original document is scanned. As described above, when one side of an original document is scanned, the original document passes through a portion of the feeding path HR (the paper supplying path R1, the introducing path R2, the first intermediate path R3 and the paper discharge path R4).

When approaching the scanning position P2, an original document is detected by a sensor unit (not illustrated). Then, the original document is scanned at the scanning position P2 by the scanning unit 1. The sensor unit is provided upstream of the first triple roller 31, for example, between the first triple roller 31 and the first twin roller 32, to be capable of detecting an original document passing through the feeding path HR in the main body 71

In this preferred embodiment a reflective sensor, for example, is used as the sensor unit.

When both sides of an original document are scanned, the original document is placed on the original document supplying tray 9 with its surface upward. Then, the original document is fed in this order: the paper supply port 8a, the nip portion A, the nip portion B, the scanning position P2, the nip portion C, and the nip portion D. Accordingly, one side (one surface) of the original document is scanned. Then, the original document is fed in this order: the selecting position P3, the nip portion E, the intersection P4, the nip portion F, the second branch point P5, the scanning position P2, the nip portion B, the first branch point P1, the nip portion G, the meeting point P6, the nip portion D, the selecting position P3, the nip portion H, and the paper discharge port 8b. Accordingly, the reverse side (the other face) of the original document is scanned. In this preferred embodiment, in order to feed an original document from the scanning position P2 to the first branch point P1, the second drive roller 32a rotates in a reverse direction while nipping the original document at the nip portion B.

In this way, when both sides of an original document (one surface and the other surface) are scanned, the original document passes through the entire feeding path HR (the paper supplying path R1, the introducing path R2, the first intermediate path R3, the reverse path R5, the second intermediate path R6, and the paper discharge path R4).

While an original document is being fed though the feeding path HR as described above, the stamp unit 73 stamps a prescribed character or a mark on the original document. Specifically, after one side of an original document is scanned, or after both sides of an original document are scanned, the original document is made stationary at the stamp position S arranged downstream of the scanning unit 1 (scanning position P2). More specifically, the original document is made stationary on the feeding path HR so as to position a rear end of the original document at the stamp position S. Then, the stamp body 73a of the stamp unit 73 is moved by the stamp body holding unit 73b (solenoid) toward the original document to stamp a prescribed character, mark, or the like.

In the preferred embodiments of the present invention, control of each member, control of each mechanism, and control of each driving device or the like are preferably performed by a controller (not illustrated). For example, the roller units (the paper supplying roller unit 20, the feed roller sets 31, 32, 33, 34, 35 and the like), the stamp unit, the sensor unit, the input unit, the guide unit and the like are preferably controlled by the controller. Further, data used in such a control is stored in a memory (not illustrated) and the data can be read out when necessary.

The above preferred embodiments have the following functions and advantages.

The ADF 8 preferably includes the feeding path HR, the scanning unit 1, and the plurality of the feed roller sets 31, 32, 33, 34 and 35 and the like. Through the feeding path HR, an original document is fed in one direction from the paper supply port 8a to the paper discharge port 8b. The scanning unit 1 scans one side or both sides of an original document on the feeding path HR. The plurality of the feed roller sets 31, 32, 33, 34 and 35 are arranged to be spaced apart from each other through the feeding path HR. When one side of an original document is scanned and when both sides of an original document are scanned, the plurality of the feed roller sets 31, 32, 33, 34 and 35 nip the original document to feed the original document along the feeding path HR. In this case, the plurality of the feed roller sets 31, 32, 33, 34 and 35 are all involved in feeding the original document.

In the above case, when an original document is fed in one direction from the paper supply port 8a to the paper discharge port 8b through the feeding path HR, the plurality of the feed roller sets 31, 32, 33, 34 and 35 are all involved in feeding the original document. In other words, when one side of an original document is scanned and when both sides of an original document are scanned, there exists no feed roller set that is not involved in feeding the original document. As described above, the ADF 8 of a preferred embodiment of the present invention can use the feed roller sets 31, 32, 33, 34 and 35 efficiently when one side of an original document is scanned and both sides of an original document are scanned. The number of feed roller sets thus is reduced. Further, since the number of feed roller sets is reduced, cost reduction, downsizing of the ADF 8 or the like are achieved.

In the ADF 8, when one side of an original document is scanned and when both sides of an original document are scanned, each of the plurality of the feed roller sets 31, 32, 33, 34 and 35 nips the original document at least one time to feed the original document along the feeding path HR.

In the above case, the feeding path HR is arranged so that each of the feed roller sets 31, 32, 33, 34 and 35 feeds an original document at least one time along the feeding path HR when the original document is scanned, and the feed roller sets are arranged through the feeding path HR. This eliminates a feed roller set that is not involved in feeding an original document and uses the feed roller sets efficiently.

In the ADF 8, at least any of the plurality of the feed roller sets 31, 32, 33, 34 and 35 preferably is a triple roller. The triple rollers 31, 33, and 35 include a pair of the driven rollers (31b, 31c), (33b, 33c), and (35b, 35c), each of which faces each other, and the drive rollers 31a, 33a, and 35a, each of which is arranged between the pairs of the driven rollers (31b, 31c), (33b, 33c), and (35b, 35c).

In the present preferred embodiment, the feeding path HR is provided and the three triple rollers 31, 33 are 35 are arranged such that an original document is fed as described below. When one side of an original document is scanned, the original document passes between either of the pairs of the driven rollers (31b, 31c), (33b, 33c), and (35b, 35c) and the drive rollers 31a, 33a, and 35a. When both sides of an original document are scanned, the original document passes between either of the pairs of driven rollers (31b, 31c), (33b, 33c), and (35b, 35c) and the drive rollers 31a, 33a, and 35a, and between the other of the pairs of driven rollers (31b, 31c), (33b, 33c), and (35b, 35c) and the drive rollers 31a, 33a, and 35a.

In the above cases, by using the triple roller 31, 33 and 35 as described above, when one side of an original document is scanned and when both sides of an original are scanned, the original document can be fed by one of the drive rollers 31a, 33a and 35a. Accordingly, the number of feed roller sets can be reduced. In other words, the feed rollers are used efficiently.

In the ADF 8, the triple roller 31 is preferably arranged upstream of the scanning unit 1 on the feeding path HR, and skew correction of an original document is performed by the triple roller 31.

In the above case, the skew correction of an original document is performed by arranging the triple roller 31 upstream of the scanning unit 1. Consequently, for example, when an original document is supplied (when one side of an original document is scanned and when both sides of an original document are scanned), between the drive roller 31a and one driven roller 31b, the skew correction is performed and then the original document can be fed. Further, when both sides of an original document are scanned, the original document can be further fed on the feeding path HR between the drive roller 31a and the other driven roller 31c. In this way, the feed rollers can be used efficiently.

In the ADF 8, the triple roller 35 is arranged on the feeding path HR in proximity to the paper discharge port 8b.

In the above case, for example, when one side of an original document is scanned, the original document can be fed to the paper discharge port 8b on the feeding path HR between the drive roller 35a and one driven roller 35c. Further, when both sides of an original document are scanned, after the original document is fed on the feeding path HR between the drive roller 35a and the other driven roller 35b, the original document can be fed to the paper discharge port 8b on the feeding path HR between the drive roller 35a and the one driven roller 35c. In this way, the feed rollers can be used efficiently.

The ADF 8 preferably further includes the selecting unit 71b. The selecting unit 71b selects a path between the paper discharge path R4 and the reverse path R5. The triple roller 33 is arranged on the feeding path HR between the scanning unit 1 and the selecting unit 71b.

In the above case, by arranging the triple roller 33 between the scanning unit 1 and the selecting unit 71b, an original document whose surface (one surface) has been scanned can be fed to the selecting unit 71b on the feeding path HR between the drive roller 33a and one driven roller 33b. Further, an original document whose surface (one surface) has been scanned can be fed to the scanning unit 1 again on the feeding path HR between the drive roller 33a and the other driven roller 33c. In this way, the feed rollers can be used efficiently.

In the ADF 8, any of the plurality of the feed roller sets 31, 32, 33, 34 and 35 is a roller set that is capable of normal and reverse rotations.

In the above case, since any of the plurality of the feed roller sets 31, 32, 33, 34 and 35, for example, the twin roller 32 is a roller set that is capable of normal and reverse rotations, an original document can be fed in two ways on the feeding path HR. In other words, the feeding path HR is used effectively. Accordingly, the feeding path HR is simplified and the ADF 8 is smaller.

The ADF 8 preferably includes the main body 71, and the cover portion 72 which is attached to the main body 71 in a freely openable and closable manner. The coupling portion 75 where the main body 71 and the cover portion 72 is coupled together preferably has a comb shape. In this preferred embodiment, by engaging the coupling portion 75b of the cover portion 72 with the coupling portion 75a of the main body 71, the cover portion 72 is positioned against the main body 71.

In the above case, since the coupling portion 75b of the cover portion 72 is engaged with the coupling portion 75a of the main body 71, the cover portion 72 can be positioned against the main body 71 without using a special fixing member or a fixing mechanism. In other words, the elimination of a fixing member or a fixing mechanism makes the ADF 8 smaller.

According to another preferred embodiment of the present invention, a multifunctional peripheral is provided with the above described ADF 8 and the scanning unit 1 arranged to scan one side of an original document or both sides of an original document on the feeding path HR. Also in this case, the same advantages as described above can be achieved.

In the multifunctional peripheral, the scanning unit 1 includes the contact glass 12 and the fixing member 13. The contact glass 12 preferably has a trapezoidal shape in cross-sectional view. At least a portion of the fixing member 13 is in contact with an inclined portion of the contact glass 12 to fix the contact glass 12.

In the above case, by making at least a portion of the fixing member 13 contact with the inclined portion of the contact glass 12, the contact glass 12 is fixed by the fixing member 13. Even if a load is applied to an upper portion of the fixing member 13, deflection of the fixing member 13 can be restricted by the contact glass 12.

Other Preferred Embodiments

Although the preferred embodiments of the present invention are described above, the present invention is not limited to the above-described preferred embodiments, and may be modified in various manners without departing from the scope of the present invention. In particular, the plurality of the preferred embodiments and other preferred embodiments described in the specification may be combined as desired.

The above preferred embodiments illustrate a case where the multifunction peripheral is preferably provided with the ADF 8. However, an apparatus with which the ADF 8 is provided does not necessarily need to be a multifunctional peripheral and may be any apparatus if the apparatus can scan an original document.

The above preferred embodiments illustrate a case where a stamp unit 73 is preferably arranged on the overlapping path R7. Instead of this case, the position of the stamp unit 73 may be anywhere on the feeding path HR downstream of the scanning unit 1 (scanning position P2), provided that the position is at a location where an original document passes overlappingly when one side of the original document is scanned and when both sides of the original are scanned. For example, the stamp unit 73 may be arranged on the paper discharge path R4.

The above preferred embodiments illustrate a case where the stamp unit 73 preferably stamps an original document downstream of the scanning position P2 of the scanning unit 1, after one side of the original document is scanned, or after both sides of the original are scanned. Instead of this case, the stamp unit 73 may stamp an original document downstream of the scanning position P2 while the original document is being scanned at the scanning position P2. Also in this case, an original document can be fed without being switched back. Further, the stamp unit 73 can stamp an original document at its proper position.

Preferred embodiments of the present invention can be widely applied to an automatic document feeder and an image scanning device, for example.

While the present invention has been described with respect to preferred embodiments thereof, it will be apparent to those skilled in the art that the disclosed invention may be modified in numerous ways and may assume many preferred embodiments other than those specifically set out and described above. Accordingly, it is intended by the appended claims to cover all modifications of the present invention that fall within the true spirit and scope of the present invention.

What is claimed is:

1. An image scanning device including an automatic document feeder, comprising:
   a feeding path through which an original document is fed in one direction from a paper supply port to a paper discharge port;
   a plurality of feed roller sets arranged along the feeding path so as to be spaced apart from each other and arranged to nip the original document to feed the original document along the feeding path when one side of the original document is scanned and when both sides of the original document are scanned, all of the feed roller sets being involved in feeding the original document;
   a scanning unit arranged to scan one side of the original document or both sides of the original document on the feeding path; and
   a selecting unit arranged to select a path between a paper discharge path that discharges the original document when one side of the original document is scanned and a reverse path that reverses the original document when both sides of the original document are scanned; wherein
   the plurality of feed roller sets includes at least one triple roller;
   when both sides of the original document are scanned, the feeding path includes the reverse path;
   when one side of the original document is scanned, the reverse path is not included in the feeding path;
   when one side of the original document is scanned, the at least one triple roller that is arranged on the feeding path and located between the paper supply port and the scanning unit nips the original document only once;
   when one side of the original document is scanned and when both sides of the original document are scanned, each of the plurality of the feed roller sets nips the original document at least one time to feed the original document along the feeding path;
   each triple roller of the at least one triple roller includes a pair of driven rollers facing each other and a drive roller arranged between the pair of the driven rollers;
   the feeding path and the at least one triple roller are arranged such that when one side of the original document is scanned, the original document passes between either of the pair of the driven rollers and the drive roller, and when both sides of the original document are scanned, the original document passes between either of the pair of the driven rollers and the drive roller and passes between the other of the pair of the driven rollers and the drive roller;

the at least one triple roller includes a first triple roller arranged on the feeding path upstream, with respect to a feeding direction of the original document, of a scanning position for the original document;

skew correction of the original document is performed by the first triple roller;

the at least one triple roller includes a second triple roller arranged on the feeding path at an area of the paper discharge port; and the at least one triple roller includes a third triple roller arranged on the feeding path between the scanning position for the original document and the selecting unit.

2. The image scanning device according to claim 1, wherein any of the plurality of the feed roller sets is capable of normal and reverse rotations.

3. The image scanning device according to claim 2, further comprising:

a main body; and a cover portion attached to the main body in a freely openable and closable manner; wherein coupling portions of the main body and the cover portion respectively have a comb shape that is complementary to each other, and the cover portion is positioned against the main body by engaging the coupling portion of the cover portion with the coupling portion of the main body.

4. The image scanning device according to claim 1, wherein the scanning unit includes a contact glass whose cross section has a trapezoidal shape, and a fixing member arranged to be partly in contact with an inclined portion of the contact glass to fix the contact glass.

5. A method for feeding an original document, comprising the steps of:

feeding an original document through a feeding path in one direction from a paper supply port to a paper discharge port;

selecting a path between the paper discharge path that discharges the original document when one side of the original document is scanned and a reverse path that reverses the original document when both sides of the original document are scanned; and making all of a plurality of feed roller sets nip an original document at least one time to feed the original document along the feeding path when one side of the original document is scanned and when both sides of the original document are scanned; wherein the plurality of feed roller sets includes at least one triple roller;

when both sides of the original document are scanned, the feeding path includes the reverse path;

when one side of the original document is scanned, the reverse path is not included in the feeding path; and when one side of the original document is scanned, the at least one triple roller that is arranged on the feeding path and located between the paper supply port and the scanning unit nips the original document only once;

when one side of the original document is scanned and when both sides of the original document are scanned, each of the plurality of the feed roller sets nips the original document at least one time to feed the original document along the feeding path;

each triple roller of the at least one triple roller includes a pair of driven rollers facing each other and a drive roller arranged between the pair of the driven rollers;

the feeding path and the at least one triple roller are arranged such that when one side of the original document is scanned, the original document passes between either of the pair of the driven rollers and the drive roller, and when both sides of the original document are scanned, the original document passes between either of the pair of the driven rollers and the drive roller and passes between the other of the pair of the driven rollers and the drive roller:

the at least one triple roller includes a first triple roller arranged on the feeding path upstream, with respect to a feeding direction of the original document, of a scanning position for the original document;

skew correction of the original document is performed by the first triple roller;

the at least one triple roller includes a second triple roller arranged on the feeding path at an area of the paper discharge port; and the at least one triple roller includes a third triple roller arranged on the feeding path between the scanning position for the original document and the selecting unit.

* * * * *